(12) United States Patent
Schwaighofer et al.

(10) Patent No.: US 7,458,794 B2
(45) Date of Patent: Dec. 2, 2008

(54) INJECTION MOULDING MACHINE

(75) Inventors: Ralf Schwaighofer, Neubeuern (DE);
Andreas Lang, Olching (DE); Franz J. Summerer, Gaensbach 25, Rimsting (DE) 83253

(73) Assignees: Webasto AG, Stockdorf (DE); Franz J. Summerer, Rimsting (DE)

( * ) Notice: Subject to any disclaimer, the term of this patent is extended or adjusted under 35 U.S.C. 154(b) by 0 days.

(21) Appl. No.: 11/573,607

(22) PCT Filed: Aug. 4, 2005

(86) PCT No.: PCT/DE2005/001390

§ 371 (c)(1),
(2), (4) Date: Feb. 12, 2007

(87) PCT Pub. No.: WO2006/015582

PCT Pub. Date: Feb. 16, 2006

(65) Prior Publication Data

US 2007/0264378 A1 Nov. 15, 2007

(30) Foreign Application Priority Data

Aug. 10, 2004 (DE) ........................ 10 2004 038 852

(51) Int. Cl.
*B28B 23/22* (2006.01)
(52) U.S. Cl. .................. 425/112; 425/588; 425/590
(58) Field of Classification Search ................. 425/588, 425/590, 589, 450.1, 451.2, 112, 591
See application file for complete search history.

(56) References Cited

U.S. PATENT DOCUMENTS

| | | | |
|---|---|---|---|
| 2,666,230 A | | 1/1954 | Sherman |
| 4,330,257 A | * | 5/1982 | Rees et al. ................. 425/556 |
| 5,015,426 A | | 5/1991 | Maus et al. |
| 5,052,909 A | * | 10/1991 | Hertzer et al. ............. 425/150 |
| 5,372,491 A | * | 12/1994 | Fritsch et al. .............. 425/130 |
| 6,558,149 B1 | * | 5/2003 | Bodmer et al. .......... 425/192 R |
| 7,128,553 B2 | * | 10/2006 | Shakal ....................... 425/190 |
| 2001/0051193 A1 | | 12/2001 | Lichtinger |
| 2004/0119205 A1 | * | 6/2004 | Eichhorn et al. ......... 264/328.8 |
| 2006/0062967 A1 | | 3/2006 | Summerer |

FOREIGN PATENT DOCUMENTS

| | | |
|---|---|---|
| DE | 4340258 A1 | 6/1995 |
| DE | 19937100 A1 | 2/2000 |
| JP | 2003103576 A | 4/2003 |
| WO | 8900103 A1 | 1/1989 |

* cited by examiner

*Primary Examiner*—Yogendra Gupta
*Assistant Examiner*—Maria Veronica D Ewald
(74) *Attorney, Agent, or Firm*—David S. Safran

(57) ABSTRACT

An injection molding machine is proposed, especially for injection stamping of large-area plastic moldings, that has at least a first injection mold which has two mold halves and which forms a first cavity with a first projected area, and a second injection which has two mold halves and which forms a second cavity with a second projected area, one mold half of each of the two injection molds being fixed on a common carrier unit. A support means for the two injection molds acts in the opening direction. In order to limit the force acting on the respective cavity, the support means, depending on the respective projected area of the respective cavity, partially take up the clamping force so that a holding pressure force acting on the material which has been injected into the respective cavity is set.

12 Claims, 4 Drawing Sheets

INJECTION MOULDING MACHINE

BACKGROUND OF THE INVENTION

1. Field of the Invention

The invention relates to an injection molding machine, especially for injection stamping of large-area plastic moldings, comprising at least a first injection mold which has two mold halves and which forms a first cavity with a first projected area, and a second injection mold which has two mold halves and which forms a second cavity with a second projected area, one mold half of the two injection molds respectively being fixed on a common carrier unit and for at least one of the two injection molds there being support means acting in the opening direction.

2. Description of Related Art

An injection molding machine of the above indicated type is known from German Patent Application DE 199 37 100 A1 and comprises two injection molds which each have a cavity bordered by two mold halves in the region of the parting plane. This injection molding machine has a turning means which comprises a reversing plate to which one mold half of the two injection molds is attached. In the parting planes of the two injection molds, there are four hydraulic cylinders arranged symmetrically. They produce a parallel, simultaneous short stroke when the injection molds are opened as a support for parallel driving of the respective mold. However, the arrangement is not suited for injection stamping of two components of a large-area plastic molding which are produced by means of cavities which have projected areas of different size. The two injection molds should be subject to the same clamping force in the closed state. However, for components with a smaller projected area it can be too large and can adversely affect the quality of the plastic molding to be produced.

German Patent DE 43 40 258 C2 discloses an injection molding machine with a multilevel mold which has two injection molds each of which has two mold halves and which can be closed by means of hydraulic gearing. The hydraulic gearing has double-acting cylinders which comprise pistons with action surfaces of different dimensions. By the corresponding triggering of the pistons when the injection molds are closed, force behaviors are implemented which are designed to be matched to the two injection molds.

Especially in the field of vehicle glazing, there is an effort to replace glass panes by injection moldings produced from transparent plastic. Especially a polycarbonate can be used for this purpose. This material, which is injected as a highly viscous amorphous substance into a cavity, must be processed with as little stress as possible to produce a pane in order to ensure durability when exposed to the weather. Stresses in the component could lead to an adverse effect on the protective lacquer layer to be applied to the hardened polycarbonate material.

For injection molding of thin-walled, large-area components, different processes can be used, such as the so-called expansion stamping process or the so-called parallel stamping process. In this connection, a liquid starting material is injected into a cavity of an injection molding machine which encompasses a so-called dip edge tool. Upon cooling, the material experiences processing shrinkage. Therefore, in all these processes, the cavity is overfilled by the shrinkage volume. The injected material is then cooled under a pressure of, for example, 200 bar. The associated volume reduction is balanced by one of the mold halves following until the component to be produced at the mold removal temperature has assumed its rated dimensions.

For reasons of engineering and economics, in the production of a plastic molding formed from two components, it can be advantageous to produce the two components in an injection molding machine, the first component which can be made pane-shaped being formed in a first cavity and the second component which forms, for example, the frame of the pane being formed as an back-injection of the first component in the second cavity. For reasons of material compatibility and to ensure a reliable connection between the two components, the material of the second component should correspond essentially to the material of the first component so that, when using polycarbonate or a polycarbonate blend, the back-injection should be executed according to a stamping process. In the forming of the second component, the problem is that processing should take place with as little stress as possible.

In a version of the first component as a pane body and the second component as a frame-like back-injection on the pane body, the base surface of the second component is smaller than that of the pane body. Stamping of the second component with the clamping force used for stamping the first component is not easily possible since the clamping force selected for stamping of the first component would lead to an overly great internal pressure in the cavity for the second component. The internal pressure is found from the product of the clamping force and the area of the cavity projected in the closing direction.

To produce a frame-like back-injection on a pane, in the past, a conventional injection molding process had been used in which, optionally, a hot channel system with needle seal nozzles is used and a holding pressure is applied by means of an injection unit over several gating points distributed over the cavity. In this process, there is the disadvantage that the internal mold pressures are very high and there is a nonuniform pressure distribution in the cavity depending on the distance to the gating points. The material shrinkage which takes place when the injected material is cooled can be balanced only up to the so-called sealing point which is, for example, roughly 190° C., at which the sprue channels freeze or the material core freezes.

Alternatively, a frame-like back-injection on a pane has been produced to date such that the second component necessary for the back-injection is placed via a hot channel distributor in a cavity, the cavity being overfilled by the shrinkage volume. During cooling, the injected material is stamped out by means of stamping dies which are actively pressed into the melt by means of special hydraulics with a fixed force. Since the force for the stamping dies must be actively applied and large area components, moreover, can have base areas of 0.5 m² or more, the required force at the desired internal pressure of roughly 200 bar rises to 10000 kN or 1000 tons. This leads, on the one hand, to very massive cylinders, force transfer systems or the like for the stamping dies having to be used. On the other hand, the power required for the hydraulics must be drawn from the injection molding machine used at the time or must be produced by means of an additional assembly.

SUMMARY OF THE INVENTION

The object of the invention is to devise an injection molding machine made according to the initially mentioned type, by means of which molded components which are formed from two components with different projected base areas and which have high quality can be easily produced according to an injection stamping process.

This object is achieved in accordance with the invention by an injection molding machine in which the support means, depending on the respective projected area of the respective cavity, partially take up the clamping force and set a holding pressure force acting on the material which has been injected into the respective cavity.

The heart of the invention, moreover, lies in that, by the support means acting in the respective parting plane, a holding pressure or internal pressure in the cavities of the two injection molds necessary for an injection stamping process can be separately set depending on the projected area of the respective cavity. Thus, a clamping force which acts on the two injection molds, which for reasons of engineering can advantageously be the same for the two injection molds, and which preferably corresponds to the clamping force which is required to produce the desired holding pressure in the cavity with the larger projected area, can be partially accommodated on the injection mold with the cavity which has a smaller projected area, so that the internal pressure or holding pressure which prevails in this cavity does not adversely affect the quality of the molding to be produced.

The injection molding machine in accordance with the invention is especially suited for producing plastic moldings which are formed from two components. The first component is formed, for example, from a transparent polycarbonate pane, conversely, the second component is the frame of the pane which is likewise produced from polycarbonate and which has a smaller base area than the pane. The polycarbonate pane is then molded according to a stamping process in the first injection mold of the injection molding machine and the frame is likewise molded according to a stamping process in the second injection mold of the injection molding machine. In this case, it is advantageous if the same holding pressure prevails in the two cavities during stamping. Since the projected area of the cavity for producing the frame is smaller than the projected area of the cavity for producing the pane, the clamping force acting on the two injection molds must be captured on the sides of the injection mold for the frame. This takes place by the support means which are assigned to the injection molding tool.

In the injection molding machine in accordance with the invention, the clamping forces for the two injection molds act in the opposite direction. In particular, the injection molding machine constitutes a so-called multilevel mold, a reversible plate mold or the like.

In one preferred embodiment of the injection molding machine in accordance with the invention, the support means are formed from hydraulic cylinders. These cylinders, which constitute compensating cylinders, are economical, passive components which can partially accommodate the clamping force without an additional hydraulic assembly so that the required holding pressure prevails in the respective cavity.

In order for the injection molds to be able to follow when the material shrinks in the cavities, the hydraulic cylinders of each injection mold are preferably provided with at least one drain valve via which hydraulic oil flows out during the stamping process.

The support means which act in the respective parting plane of the injection molds can be integrated either directly into the respective injection mold or can be clamped between a mounting plate or mold clamping plate for the respective injection mold and the common carrier unit.

To produce a molded part from two components, it is advantageous if the injection molding machine comprises a reversing means by which the first component, after its production in the first cavity, is transferred to the second injection mold so that, in it, the second component can be molded. The mold halves which are fixed on the carrier unit can then be assigned to the two injection molds.

In order to seal the cavity, there can be pre-tensioned sealing strips and/or slides which border the second cavity. The sealing strips or slides can be actuated with an adjustable applied pressure.

Other advantages and advantageous configurations of the subject matter in accordance with the invention can be taken from the specification and accompanying schematically simplified drawings which show three embodiments of the injection molding machine in accordance with the invention.

DETAILED DESCRIPTION OF THE INVENTION

Figure 1:
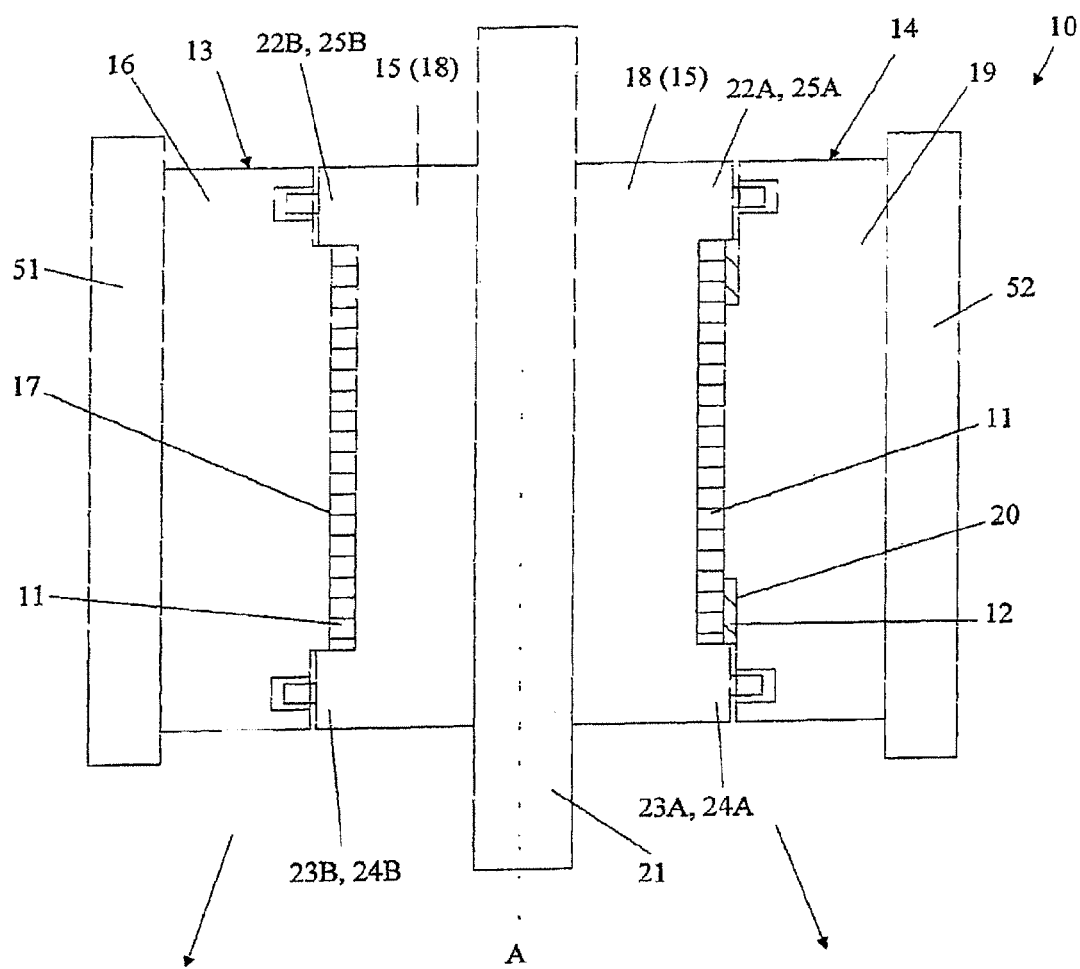
FIG. 1 is a sectional view through an injection molding machine made in accordance with the invention and a perspective view of moldings produced by means of the injection mold machine.
Figure 1:
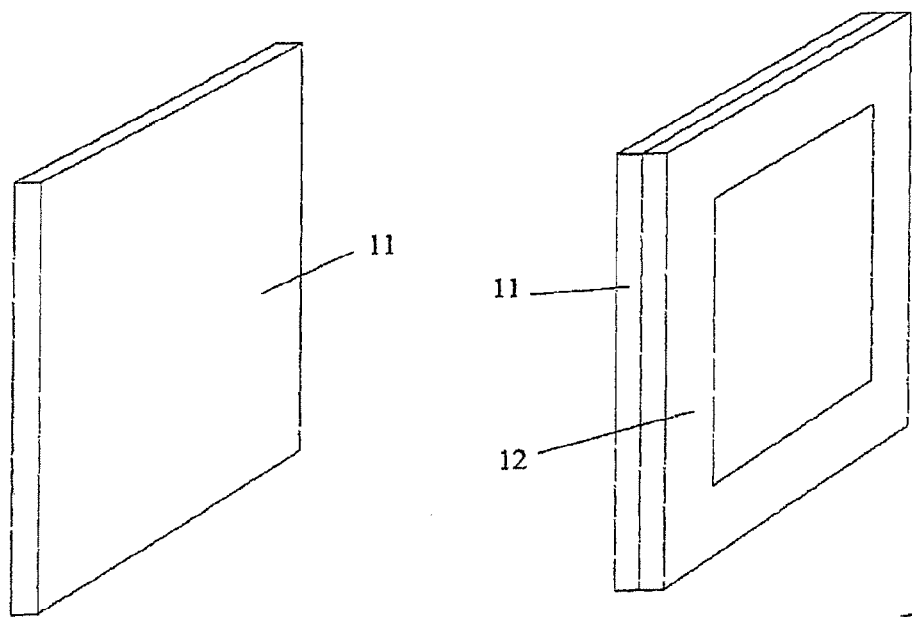
Figure 2:
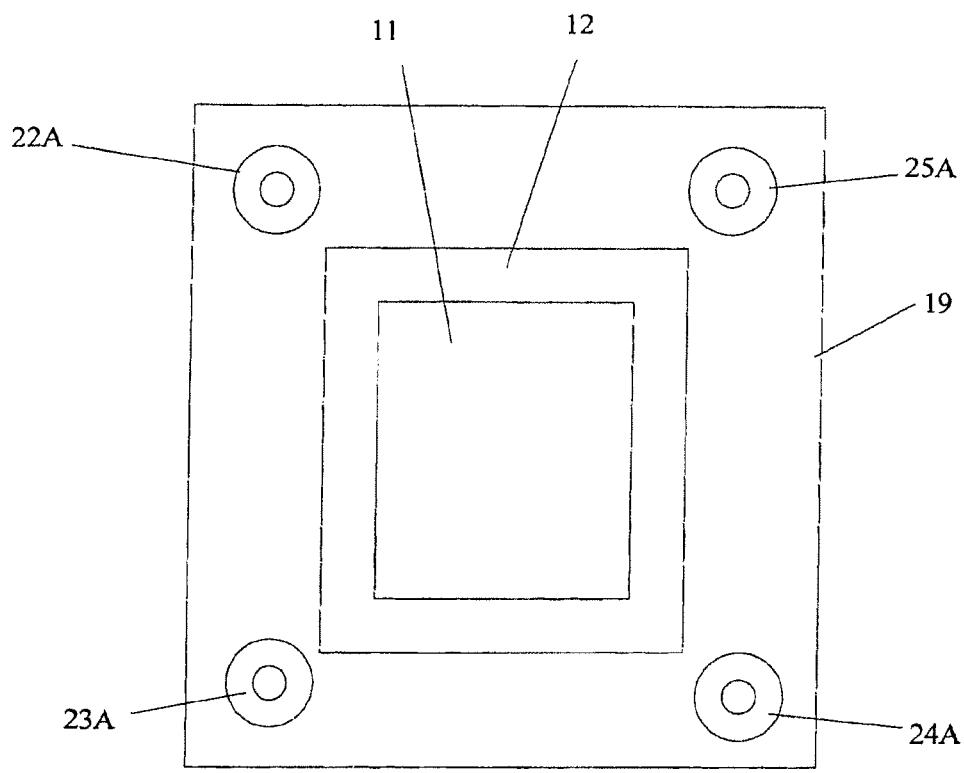
FIG. 2 is a front view of a mold half of an injection mold of the injection molding machine shown in FIG. 1, which mold half has support cylinders.

FIGS. 1 & 2 show an injection molding machine 10 which is used to produced a pane 11 which is used, for example, in a motor vehicle and which is provided, for example, with a frame 12. The pane 11 which has been provided with the frame 12 is, for example, the cover element of a sliding vehicle roof. The pane 11 and the frame 12 are produced with the injection molding machine 10 according to an injection stamping process.

The injection molding machine 10 comprises a first injection mold 13 for producing the pane 11 and a second injection mold 14 for back-injection of the frame 12 onto the pane 11.

The injection mold 13, which constitutes a dip edge mold and which is made as a stamping mold, comprises a first mold half 15 which is made as a so-called retainer plate and a second mold half 16 which is made as a so-called mold core plate. The two mold halves 15, 16 define a first cavity 17 which corresponds to the shape of the pane 11. As is conventional in a stamping process, the two mold halves 15, 16 can be moved toward one another in the production of the pane 11 for compensating for material shrinkage which accompanies the cooling of a polycarbonate supplied via a sprue channel (not shown). In this case, the mold half 15 which is fixed on a carrier unit 21 which is used as a reversing plate is stationary during stamping and the mold half 16 which is attached to the mold clamping plate 51 can be moved by means of a drive in the direction of the mold half 15.

The second injection mold 14, which is used to produce the frame 12, likewise, comprises a first mold half 18 which is fixed on the reversing plate 21 and a second mold half 19 which is attached to the mold clamping plate 52. The two mold halves form a second cavity 20 which corresponds to the shape of the frame 12.

The injection mold 14 is, likewise, made as a stamping mold so that the mold half 19, when cooling a material placed in the cavity 20 via several sprue gates (not shown), can follow according to the shrinkage in the volume of the material so that an essentially constant closing pressure acts on the material which has been injected into the cavity 20 to form the frame 12.

Alternatively, the injection molding machine can also be designed such that, during stamping, one of the two mold halves 16, 19 is stationary and the other of the two mold halves 16, 19 and the reversing plate 21 can follow.

Since the two mold halves 15, 18 are fixed on the reversing plate 21, the mold half 15 of the injection mold 13 can be moved to the location of the mold half 18 of the injection mold 14 by turning the reversing plate around the axis A so that the frame 12 can be back-injected onto the pane which has been produced by means of the injection mold 13 without being removed from the injection molding machine 10.

In this case, the second injection mold 14, which likewise constitutes a dip edge mold also comprises four support means 22A to 25A which are made as hydraulic cylinders which are arranged in a rectangle, which are located on the mold half 19, which act on the mold half 18 and which counteract the clamping force which acts via the mold half 19 on the material which has been injected into the cavity 20 to form the frame 12. The hydraulic cylinders 22A to 25A constitute passive components that act in the parting plane of the injection mold 14.

To reduce the pressure in the hydraulic cylinders 22A to 25A, they are each provided with at least one drain valve via which the hydraulic oil flows out during the stamping process.

Accordingly, the first injection mold 13, in this case, comprises four support means 22B to 25B which are made as hydraulic cylinders, which are arranged in a rectangle, which are located on the mold half 16, which act on the mold half 15 and which counteract the clamping force which acts via the mold half 16 on the material which has been injected into the cavity 17 to form the pane 11. The hydraulic cylinders 22B to 25B constitute the passive components that act in the parting plane of the injection mold 13.

To reduce the pressure in the hydraulic cylinders 22B to 25B, they are each, likewise, provided with at least one drain valve via which the hydraulic oil flows out during the stamping process.

Depending on the prevailing force conditions, a different number of hydraulic cylinders can also be provided on each of the two injection molds 13, 14.

Alternatively, it is also possible to place the hydraulic cylinders 22A to 25A and 22B to 25B on the mold halves 15, 18 respectively. In this case, the hydraulic cylinders 22A to 25A and 22B to 25B, depending on the rotational position of the reversing plate 21, are assigned to the injection mold 13 or the injection mold 14. The oil pressure acting in the hydraulic cylinders must then likewise be matched as necessary to the respective position.

Figure 3:
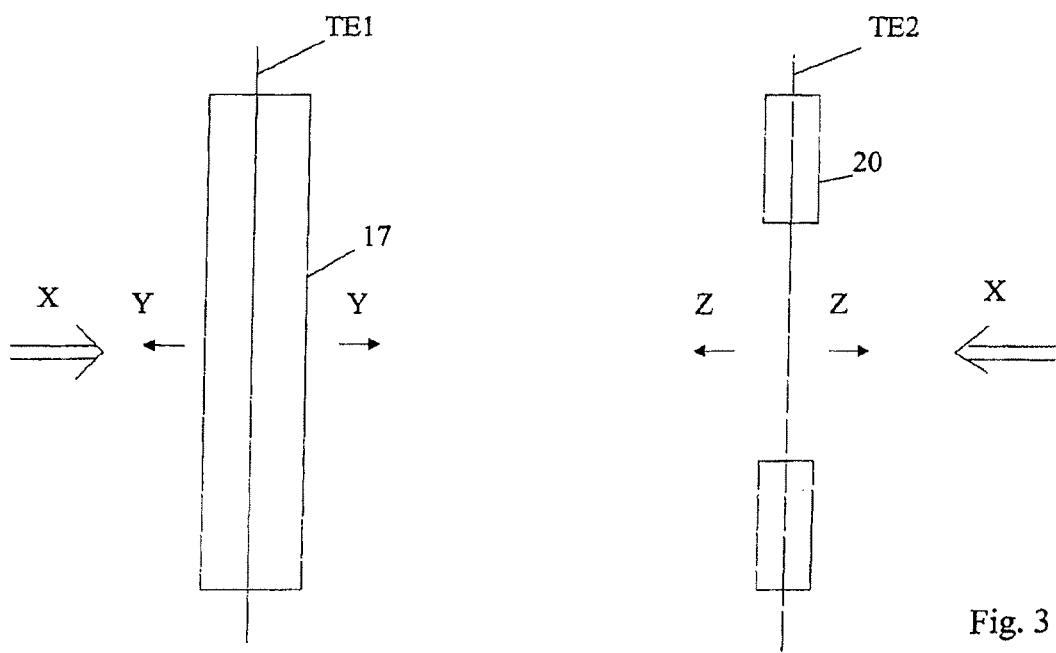
FIG. 3 shows the action of the support cylinders.

The manner of operation of the support means 22A to 25A and 22B to 25B is described below using an example in conjunction with FIG. 3.

The pane 11, in this case, has a base area of 1 m². The frame 12 has a base area of 0.25 m² in this case.

To produce the pane 11, the first cavity 17, which has a base area of 1 m² is filled and overfilled with liquid polycarbonate since, when cooling from the injection temperature of 300° C. to the mold removal temperature of 120° C., the wall thickness shrinks by roughly 10%. Overfilling by roughly 10% thus takes place to compensate for the shrinkage volume. For an ideal internal mold pressure of 200 bar, over the cooling phase a clamping force X of 20,000 kN or 2,000 tons is set on the injection molding machine 10. The force acting on the injected material by the clamping force X constitutes the so-called holding pressure force Y. To keep the holding pressure force Y constant, the mold plate which forms the mold half 16 moves by $4/10$ mm to compensate for material shrinkage over the cooling time of, for example, 60 seconds. This takes place by hydraulic oil being released from the hydraulic cylinders 22B to 25B which are acting in the parting plane TE1 which is assigned to the cavity 17.

For the purposes of the multilevel principle present in this case, for the injection molding machine 10, the same clamping force is available for the two injection molds 13, 4. The clamping force of 20,000 kN, moreover, also prevails on the second injection mold 14 which is used, at the same time, for back-injection of the frame 12 onto an already completed pane 11. This clamping force would lead to an internal pressure of 800 bar prevailing in the cavity 20 due to the smaller area of the frame 12 (0.25 m²) which is to be produced. This pressure could result in the part being damaged. To counteract this, by means of the hydraulic cylinders 22A to 25A, matched to the base area of the frame 12 and the desired pressure prevailing in the cavity 20 of likewise roughly 200 bar, the clamping force of 20,000 kN is damped so that a so-called holding pressure force of 5,000 kN or 500 tons is acting on the cavity 20 or the polycarbonate material which has been injected into the cavity 20, the remaining force of 15,000 kN being captured by means of the hydraulic cylinders 22A to 25A acting in the parting plane TE2 (FIG. 3) which is assigned to the cavity 20 and being absorbed by them. The hydraulic cylinders 22A to 25A are, moreover, pre-tensioned relative to the hydraulic pressure necessary for this purpose, the mold half 19 following when the material which has been placed in the cavity 20 is cooled, and for the material shrinkage associated therewith, a controlled release of the hydraulic oil of the hydraulic cylinders 22A to 25A is produced.

Therefore, the hydraulic cylinders 22A to 25A which act in the opening direction of the injection mold 14 take up the difference between the clamping force X and the holding pressure force which is desired in the cavity 20.

The support means 22A to 25A and 22B to 25B partially take up the clamping force depending on the respective area of the respective cavity 17, 20 projected in the closing direction and set the holding pressure force acting on the material which has been injected into the respective cavity 17, 20. The holding pressure force is found from the product of the internal pressure prevailing in the respective cavity 17, 20 and the projected area of the pertinent cavity.

When a frame 20 with a different base area is to be injected onto the pane 11, the hydraulic cylinders 22A to 25A can be subjected to a correspondingly matched internal cylinder pressure so that the holding pressure acting on the material which is being used to produce the frame is set to the desired value.

Figure 4:
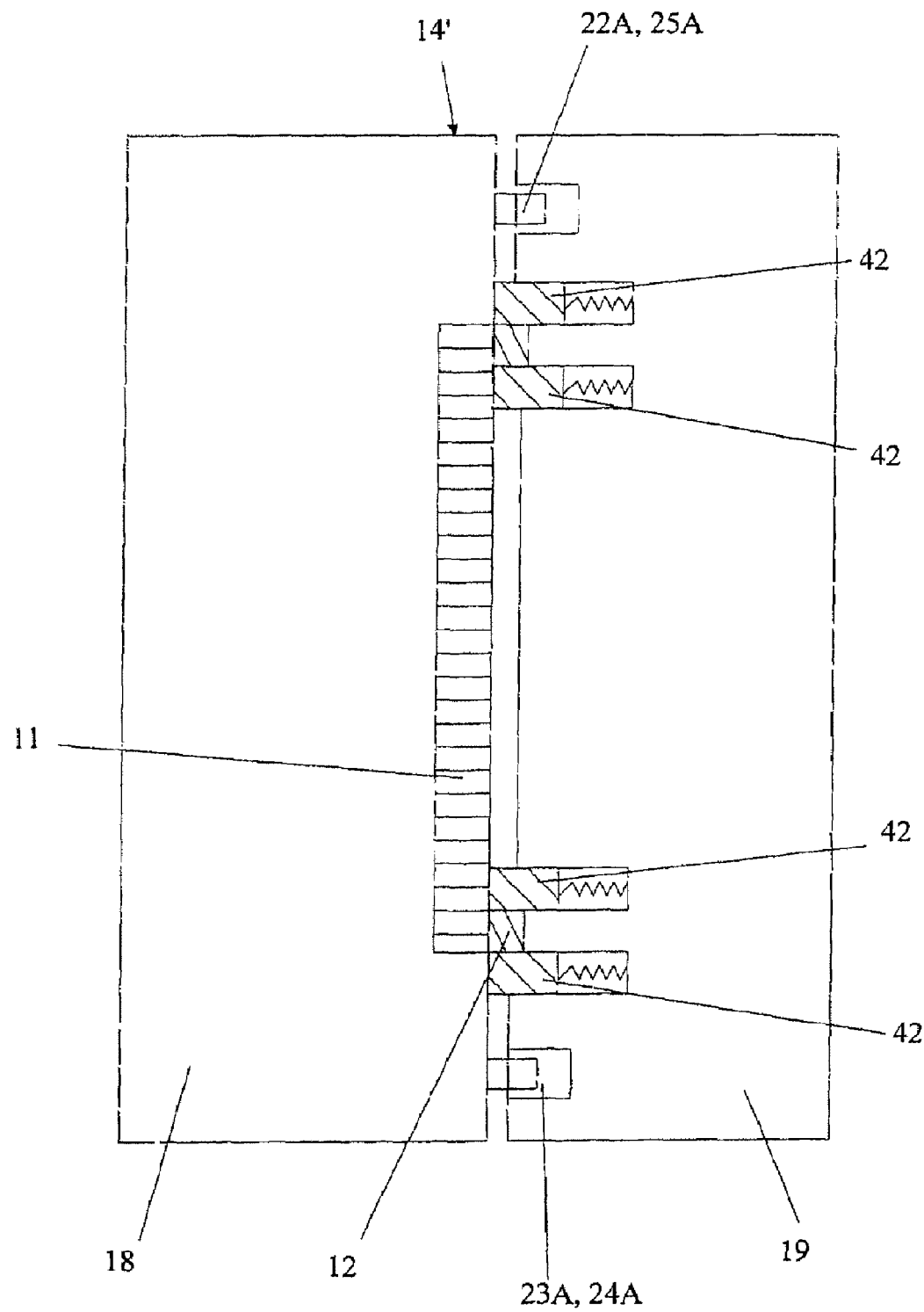
FIG. 4 is a sectional view through an injection mold of a second embodiment of an injection molding machine in accordance with the invention which is used to produce a back-injection on a pane.

FIG. 4 shows a special embodiment of an injection mold 14' for producing a frame 12 of a transparent polycarbonate pane 11, which frame constitutes a second component of a molding, for use, for example, in a motor vehicle.

The injection mold 14' is a component of an injection molding machine made according to the injection molding machine as shown in FIG. 1, and for an injection process, must be sealed in the region of the transition to the pane 11 which forms the first component. Therefore, in this region, there are mechanically or pneumatically spring-actuated sealing strips or slides 42 which are supported on a mold half 19, which act with an adjustable force of the pre-injection molded part which has been formed from the pane 11, and which thus seal the cavity 20 to form the frame 12.

Otherwise, the injection mold 14' is made essentially corresponding to the injection mold shown in FIG. 1.

Figure 5:
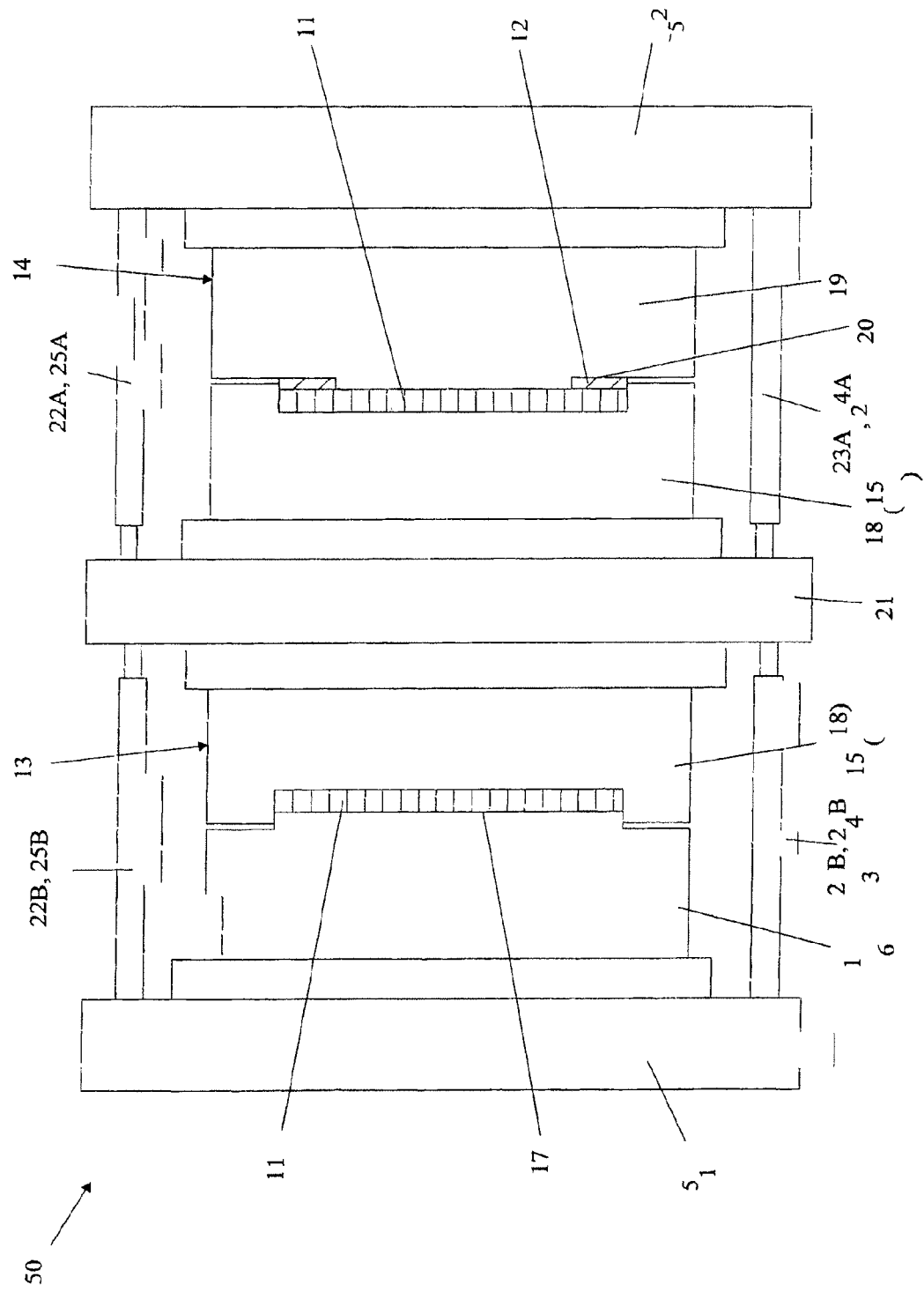
FIG. 5 is a sectional view of a third embodiment of the injection molding machine in accordance with the invention.

FIG. 5 shows another embodiment of an injection molding machine 50 which corresponds essentially to that as shown in FIG. 1, but differs from it in that it has hydraulic cylinders 22A to 25A and 22B to 25B which are not integrated into the injection molds 13, 14, but are clamped between a mold clamping plate 51 which is assigned to the injection mold 13 and the reversing plate 21, and between a mold clamping plate 52 which is assigned to the injection mold 14 and the reversing plate 21. The operation and action of these hydraulic cylinders correspond to those of the hydraulic cylinders of the injection molding machine as shown in FIG. 1.

What is claimed is:

1. Injection molding machine for injection stamping of large-area plastic moldings, comprising:
    at least a first injection mold which has two mold halves and which forms a first cavity with a first projected area, and
    a second injection mold which has two mold halves and which forms a second cavity with a second projected area, the second projected area being different from the first projected area such that one of said projected areas is larger than the other projected area
    a common carrier unit on which one mold half of each of the first and second injection molds is disposed,
    means for applying a clamping force, sufficient to produce a desired holding pressure in the cavity with the larger projected area, to both of said first and said second injection molds and
    support means for acting on at least one of the two injection molds in an opening direction when said first and second cavities are closed,
    wherein the support means, depending on the respective projected area of the respective cavity, partially take up the clamping force acting thereon and separately set a holding pressure force acting on material which has been injected into the respective cavity such that said clamping force sufficient to produce the desired holding pressure in the cavity with the larger projected area is adjusted to a desired different holding pressure in the cavity which has a smaller projected area.

2. Injection molding machine as claimed in claim 1, wherein the support means comprise hydraulic cylinders.

3. Injection molding machine as claimed in claim 2, wherein the hydraulic cylinders of each injection mold are provided with at least one drain valve via which hydraulic oil flows out during a stamping process.

4. Injection molding machine as claimed in claim 1, wherein the support means are integrated into the injection mold.

5. Injection molding machine as claimed in claim 1, wherein the support means are clamped between the common carrier unit and a mold clamping plate which supports the other half of a respective one of the first and second injection molds.

6. Injection molding machine as claimed in claim 1, wherein the carrier unit comprises a reversing means.

7. Injection molding machine as claimed in claim 1, wherein at least one of pre-tensioned sealing strips and slides border the second cavity.

8. Injection molding machine as claimed in claim 7, wherein the at least one of the sealing strips and slides are subjected to an adjustable application pressure.

9. Injection molding machine as claimed in claim 2, wherein the support means are integrated into the injection mold.

10. Injection molding machine as claimed in claim 2, wherein the support means are clamped between the common carrier unit and a mold clamping plate which supports mold the other half of a respective one of the first and second injection molds.

11. Injection molding machine as claimed in claim 5, wherein the carrier unit comprises a reversing means.

12. Injection molding machine as claimed in claim 4, wherein at least one of pre-tensioned sealing strips and slides border the second cavity.

* * * * *